United States Patent [19]

Lamèrant et al.

[11] Patent Number: 4,613,361

[45] Date of Patent: Sep. 23, 1986

[54] HIGH-TEMPERATURE PRETREATMENT BY MEANS OF AN ALKALINE AQUEOUS SOLUTION OF ORES HAVING AN ARGILLACEOUS GANGUE CONTAINING AT LEAST ONE USABLE ELEMENT

[75] Inventors: Jean-Michel Lamèrant, Bouc Bel Air; François Pallez; Pierre-Bernard Personnet, both of Aix en Provence, all of France

[73] Assignee: Uranium Pechiney, Courbevoie, France

[21] Appl. No.: 686,267

[22] PCT Filed: Apr. 18, 1984

[86] PCT No.: PCT/FR84/00110

§ 371 Date: Nov. 28, 1984

§ 102(e) Date: Nov. 28, 1984

[87] PCT Pub. No.: WO84/04333

PCT Pub. Date: Nov. 8, 1984

[30] Foreign Application Priority Data

Apr. 27, 1983 [FR] France ................................ 83 07223
Sep. 21, 1983 [FR] France ................................ 83 15271

[51] Int. Cl.$^4$ ................................................ C22B 1/00
[52] U.S. Cl. .......................................... 75/2; 75/101 R; 75/108; 423/2; 423/3; 423/22; 423/27; 423/53; 423/66; 423/98; 423/104; 423/127; 423/140; 423/150
[58] Field of Search ................. 423/2, 3, 22, 27, 53, 423/66, 98, 104, 127, 140, 150; 75/2, 1 R, 101 R, 108

[56] References Cited

U.S. PATENT DOCUMENTS 2,992,887  7/1961  Thunaes ............................. 423/53
3,238,038  3/1966  Hunter et al. ....................... 423/22

FOREIGN PATENT DOCUMENTS 2432554  2/1980  France .
2512005  3/1983  France .

Primary Examiner—John Doll
Assistant Examiner—Robert L. Stoll
Attorney, Agent, or Firm—Dennison, Meserole, Pollack & Scheiner

[57] ABSTRACT

A process for pretreatment at high temperature by means of an aqueous pretreatment solution, of crushed ores containing at least one usable metal element, whose gangue contains argillaceous compounds which, in the attack operation for making use of the ore, are capable of forming a stable plastic suspension in the presence of water, which makes it virtually impossible subsequently to separate the liquid and solid phases by virtue of its character being such that it cannot be subjected to filtration and/or settlement, which is characterized in that, to cause stabilization of the argillaceous gangue before the operation of subjecting the ore to attack and to produce easy separation of the liquid and solid phases after the attack operation, the ore, the granulometry of which is at most equal to the liberation sieve mesh size of the metal or metals to be put to use, and before being subjected to the attack operation for making use of the ore, is brought into contact with an aqueous pretreatment solution containing at least $2.10^{-5}$ g/l of OH$^-$ ions, then the medium formed is immediately raised to the minimum pretreatment temperature of at least 120° C. in a period of time of at most 30 minutes reckoned from the time at which the ore is brought into contact with the aqueous pretreatment solution.

16 Claims, No Drawings

HIGH-TEMPERATURE PRETREATMENT BY MEANS OF AN ALKALINE AQUEOUS SOLUTION OF ORES HAVING AN ARGILLACEOUS GANGUE CONTAINING AT LEAST ONE USABLE ELEMENT

The present invention concerns a process for pretreatment at high temperature, by means of an alkaline aqueous solution, of ores containing at least one usable element, the gangue of which contains argillaceous compounds which are capable of forming a stable plastic suspension in the presence of water.

The applicants use the term 'pretreatment' to define a hydrometallurgical treatment prior to extraction of the usable element or elements in the ore in order subsequently to impart to the solid phase, in the presence of a liquid phase, a capacity for easy separation of the two phases in question.

The applicants use the term 'usable element' to define all the metallic elements which are present in at least one of the minerals constituting the argillaceous ore, which are capable of being extracted therefrom in order to be put to use, such as for example uranium, vanadium, molbdenum, gold, nickel . . . .

The man skilled in the art has long been aware that argillaceous compounds forming the gangue of certain ores (which it would be desirable to make use of) have a real tendency to swell, then split up and finally disperse in the form of fine crystals and small agglomerates in contact with an aqueous phase. That phenomenon makes it very difficult to carry out hydrometallurgical treatments for making use of such ores since the suspension produced becomes unsuitable for separation of the liquid and solid phases, both by filtration and by settling, or the suspension may occur in a condition of high viscosity.

Argillaceous compounds which are capable of forming a stable plastic suspension upon contact with water, which are frequently present in the above-mentioned argillaceous-gangue ores, may belong to the groups formed by kaolinites such as for example kaolinite, dickite, halloysite, disordered kaolinites and serpentines; the mica group such as for example muscovite, biotite and paragonite, pyrophyllite and talcum, illites and glauconite; the montmorillonite group such as for example beidellite, stevensite, saponite and hectorite; the chlorite group; the vermiculite group; the group of interstratified clays whose unitary structure is a combination of the preceding groups; the group of fibrous clays such as for example attapulgite (palygorskite) and sepiolite. Such argillaceous-gangue ores may also contain other compounds such as for example quartz, calcite ($CaCO_3$), dolomite, gypsum, limonite ($FeO(OH)n$-$H_2O$) and other metal oxides and hydroxides.

If hydrometallurgical processes for the treatment of ores, that is to say, for attacking ores, are generally well known to the man skilled in the art, it is also well known that argillaceous-gangue ores require specific treatments which are adapted to the gangue and/or to the element included therein, which is to be put to use.

It is found that it is, if not impossible, at least very difficult simply to transpose known hydrometallurgical processes for treating ores having a gangue which is at most slightly argillaceous, to ores having a gangue which is highly argillaceous, because the suspension resulting from the attack operation is found to be unsuitable for separation of the liquid and solid phases.

Among hydrometallurgical processes for treating ores, for example uraniferous ores, it is known preferably to effect the alkaline oxidising attack on the uranium ore by means of an aqueous solution of sodium carbonate and/or bicarbonate. The attack operation is generally performed in the presence of free oxygen which is blown into the hot reaction medium in order to permit oxidation and solubilisation of the uranium but also to provide for oxidation of the sulphides of impurities and the organic materials present in the ore.

Thus, the specialist literature in this art has described modes of operation for carrying out the oxidising alkaline attack operation (The extractive Metallurgy of Uranium, by Robert C. Merritt, edited by Colorado School of Mines Research Institute 1971 edition, pages 83 ff).

A first mode of operation comprises attacking a uraniferous ore, preferably with a high carbonates content, by means of a liquor containing from 40 to 50 g/l of $Na_2CO_3$ and from 10 to 20 g/l of $NaHCO_3$ in the presence of oxygen or air which is blown into the reaction medium. The conditions of the attack operation, which is carried out in an autoclave, fall into a range of temperatures of between 95° C. and 120° C. and a range of total pressure obtaining in the chamber of between 2 and 6.5 bars, while the durations of the attack operations may vary between 4 and 20 hours.

In a second mode of operation, the same uraniferous ore with a high proportion of carbonates therein is subjected to attack by means of the same liquor containing from 40 to 50 g/l of $Na_2CO_3$ and from 10 to 20 g/l of $NaHCO_3$, in the presence of oxygen or air which is blown into the reaction medium. However, the conditions of the attack operation, which is carried out in a 'Pachuca' are different: the temperature is in the range of from 75° C. to 80° C. while the pressure at which the air or oxygen is injected into the reaction medium is in the range of from 2 to 3 bars, with the attack operation being 96 hours in duration.

In another mode of operation, as described in U.S. Pat. No. 3,036,881, the uraniferous ore containing hexavalent uranium is attacked for a period of about 6 hours in the presence of oxygen by means of a liquor containing from 4.2 g/l to 70 g/l of sodium bicarbonate and from 40 g/l to 100 g/l of sodium carbonate, the attack operation being carried out in the presence of an oxidation catalyst at a temperature of about 80° C. to 90° C.

Such modes of operation which are found to be an attractive proposition in regard to attacking certain uraniferous ores are difficult to apply when he situation involves attacking ores whose gangue is formed by argillaceous compounds and possibly carbonate-bearing and sulphate-bearing compounds, alkaline-earth elements, as well as silica, as applying such a process to an ore having an argillaceous gangue certainly results in correct solubilisation of the metal which is to be put to use, but it also results in the formation of a suspension resulting from the attack operation, in respect of which it is virtually impossible to provide for separation of the liquid and solid phases, irrespective of the amount of flocculating agent added, because it is of such a nature that it cannot be subjected to filtration and even settlement.

Among hydrometallurgical processes for treating ores, some of the processes described in the specialist literature comprise subjecting the ores to an alkaline oxidising attack at higher temperatures by means of a solution which has a much higher concentration of sodium carbonate and bicarbonate.

A first example may be taken from U.S. Pat. No. 3,429,693. That patent proposes a process for attacking a beryllium, vanadium, molybdenum or tungsten ore by means of an aqueous solution which in practice contains at least 100 g/l and which may attain more than 500 g/l of trona (being a natural compound of $Na_2CO_3$, $NaHCO_3$, $2H_2O$) to arrive at a good dissolution yield, and at a temperature of between 60° and 250° C. for a period of time which in practice is between 90 minutes and 240 minutes. Such a mode of operation, which is found to be an attractive proposition in regard to attacking ores having a gangue which is not argillaceous or which is slightly argillaceous, containing molybdenum, vanadium, beryllium or tungsten, cannot be applied to an ore having a gangue which is markedly argillaceous for, in the absence of previous calcination of the argillaceous ore at about 900° C. (Example 7 of the above-quoted patent), it results in the formation of a suspension which is of a plastic character, resulting from the attack operation, in respect of which it is virtually impossible to provide for separation of the liquid and solid phases, irrespective of the amount of flocculating agent used.

Another example which is taken from the journal 'Les Techniques: Industrie Minérale', published in November 1982, concerning 'les journées d'études 1982 des sections Mines et Mineralurgie' ('1982 Symposium of the Mines and Mineralurgy sections'), Besancon, 6th to 7th May 1982, by Ollivier, Thomassin and Winter, concerns a process for making use of an argillaceous gold-bearing ore. That process comprises treating the ore with an aqueous solution of sodium cyanide which has the property of dissolving gold. As the operations for separation of the liquid and solid phases after the attack operation, by means of filtration or settlement, result either in excessively long settlement times or excessive filtration areas, which in both cases give rise to high capital investment and working costs, the gold-bearing suspension resulting from the cyanide attack is treated by means of activated carbon. The carbon traps the gold which is in a dissolved condition by a process comparable to ion exchange, the gold-bearing carbon in which the grains are larger than those of the ore of the sterile gangue being separated by sieving.

Since the application of conventional attack processes to ores in which the gangue is formed inter alia by argillaceous compounds in fact results in correct solubilisation of the metal which is to be put to use, while however also resulting in the formation of a suspension resulting from the solubilisation operation, in respect of which it is virtually impossible to provide for separation of the liquid and solid phases by virtue of its character being such that it cannot be subjected to filtration and even settlement, irrespective of the amount of flocculating agent added, the applicants, continuing their research, found and developed a process for high-temperature pretreatment of ores having an argillaceous gangue, without preliminary calcination, by means of an alkaline aqueous solution, which permits the liquid and solid phases subsequently to be very easy separated.

The process according to the invention for high-temperature pretreatment by means of an aqueous solution referred to as the pretreatment solution, of ores containing at least one usable metal element, whose gangue contains argillaceous compounds which, upon the attack operation for making use of the ore, are capable of forming a stable plastic suspension in the presence of water, which makes it virtually impossible subsequently to separate the liquid and solid phases by virtue of its character being such that it cannot be subjected to filtration and/or settlement, is characterised in that, to cause stabilisation of the argillaceous gangue before the operation of subjecting the ore to attack and to produce easy separation of the liquid and solid phases after the attack operation, the ore, the granulometry of which is at most equal to the liberation sieve mesh size of the metal or metals to be put to use, and before being subjected to the attack operation for making use of the ore, is brought into contact with an aqueous pretreatment solution containing at least $2.10^{-5}$ g/l of $OH^-$ ions and then the medium formed is immediately raised to the minimum pretreatment temperature of at least 120° C. in a period of time of at most 30 minutes reckoned from the time at which the ore is brought into contact with the aqueous pretreatment solution.

As the man skilled in the art is well aware, the ore at the moment of being brought into contact with the aqueous pretreatment solution must be of a granulometry corresponding at most to the liberation mesh size of the element or elements which are to be put to use.

When the ore does not naturally have such a granulometry, it is subjected to a crushing operation which is preferably carried out in the absence of any addition of aqueous phase.

Since the ore has a granulometry corresponding at most to the liberation mesh size of the usable element or elements, the flow of solid particles must take place with a fluidity close to that of a dry silica sand.

However, it may happen that, before crushing, the ore has an amount of water such that the solid particles after crushing have a tendency to form agglomerates or granules which prevent those particles from flowing properly. In that case, the ore is subjected to a drying operation prior to the crushing operation or is simultaneously crushed and dried whereby the solid particles resulting therefrom have a flow capacity equivalent to that of dry silica sand.

As already stated above, the aqueous pretreatment solution according to the invention is alkaline. The aqueous solution contains compounds which, when brought into contact with water, give off $OH^-$ ions. Such compounds are for example alkaline hydroxides and alkaline-earth hydroxides such as those of calcium and barium, and alkaline carbonates such as those of sodium, potassium and ammonium, wherein the ammonium carbonate may contain ammonium carbonate. Its level of concentration in respect of $OH^-$ ions is at least $2.10^{-5}$ g/l.

Depending on the nature of the ore, the reactant concentration of the alkaline pretreatment solution may vary within wide limits. Thus, the concentration in respect of $OH^-$ may vary between $2.10^{-5}$ g/l and 20 g/l but is preferably between $2.10^{-4}$ g/l and 12 g/l.

Once the ore and the aqueous pretreatment solution have the desired characteristics, they are brought into contact, thus forming the pretreatment medium which occurs in the form of a suspension which is preferably prepared by introducing the solid phase into the liquid phase.

The ratio between the liquid phase, expressed in cubic meters, and the solid phase, expressed in tonne of ore (L/S) is always higher than 1 and is preferably between 2 and 10.

In accordance with a particular mode of operation, it may be an attractive proposition to effect the pretreatment operation in a more or less oxidising medium by introducing a suitable oxidising agent.

The oxidising agent may be used in at least one of the gaseous, liquid or solid forms.

When it is in gaseous form, the oxidising agent, being free oxygen, is selected for example from the group comprising air, oxygen-enriched air, oxygen alone and ozone. It is introduced by blowing under a pressure such that the oxygen partial pressure in the reaction vessel is in the range of from 0.1 to 20 bars but preferably from 5 to 15 bars.

When it is in a non-gaseous form the oxidizing agent is selected from known oxidising compounds such as for example potassium permanganate, persulphates or hydrogen peroxide, which may be introduced in solid form or in the form of an aqueous solution.

In an alternative mode of operation which may be found to be an attractive proposition in accordance with the process of the invention, $CO_2$ gas may be injected into the reaction medium while the pretreatment operation is being carried out or at the end of the pretreatment operation.

The operation of injecting the $CO_2$ gas may be performed continuously or intermittently, at a constant or variable flow rate. Thus, the injection of $CO_2$ gas makes it possible simultaneously to control and adjust the proportion of $OH^-$ ions in the reaction medium.

The temperature at which the pretreatment operation is effected, being at least 120° C., is accordingly defined as the minimum pretreatment temperature; it is preferably in the range of from 140° to 300° C., depending on the nature of the argillaceous gangue of the ore.

The duration of the pretreatment operation is generally short, it being appreciated that the duration of the pretreatment operation decreases in proportion to the operating temperature used being at the higher values in the corresponding temperature range.

The length of time taken for the pretreatment operation is broken down into two periods:

a first period, referred to as the temperature rise period, for the rise in temperature of the suspension to the minimum pretreatment temperature, which period must be very short; it is selected to fall between instantaneous operation and at most 30 minutes and preferably between instantaneous operation and at most 20 minutes, that period of time being counted from the time at which the ore is brought into contact with the aqueous pretreatment solution;

a second period, referred to as the residence period at at least 120° C., which corresponds to a duration which is preferably selected to fall within the range of from 30 minutes to 1 minute and which does not need to exceed 60 minutes as extending the period of residence at the selected temperature above the minimum pretreatment temperature, beyond a time of 60 minutes, does not further enhance the suitability for subsequent liquid-solid separation.

If however the following phase of treatment requires a temperature which is equal to or higher than the pretreatment temperature, the second pretreatment period may be included in the following phase of the treatment.

During the pretreatment, the suspension may be subjected to a minimum degree of mechanical agitation, but agitation which is at least sufficient to resist settlement of the largest grains of the solid phase.

The applicants have in fact found, in many experiments which led them to the invention, that the argillaceous ores which are brought into contact with an aqueous phase, the temperature of which is below 120° C., being subjected to a prolonged mechanical agitation action, are very progressively broken up with the production of extremely fine particles, the largest dimension of which is generally less than two microns, inhibiting separation of the solid and liquid phases by virtue of the occurrence of an irremediably stable plastic suspension.

Thus, by virtue of the pretreatment process according to the invention, the clay break-up process which occurs in the presence of an aqueous phase is virtually irreversibly inhibited, which makes it possible subsequently and at the appropriate moment to effect any subsequent treatment for putting the material into useful form, such as for example an acid or alkaline attack in a reaction vessel on the pretreated argillaceous-gangue ore, which may readily include agitation, storage, transportation and separation steps.

In addition, the pretreatment process according to the invention does not subsequently cause any limitation in regard to the yields in respect of solubilisation of the element which is to be put into useful form, irrespective of the type of treatment carried out, whether acid or alkaline, whether at low temperature or at high temperature.

Finally, in order to facilitate separation of the liquid and solid phases of the suspension resulting from treatment of the ore in accordance with the invention, it is desirable to introduce a flocculating agent in dilute aqueous solution, generally at a concentration which is at most 1 gram per liter, using quantities which do not exceed 500 grams per tonne of ore, while however always being adapted to the desired results.

The advantages of the process according to the invention will be more clearly appreciated from the Examples which are given by way of illustration.

EXAMPLE 1

This Example illustrates the beneficial influence on separation of the liquid and solid phases of the pretreatment according to the invention of an ore having an argillaceous gangue, by means of an alkaline aqueous solution, and more particularly, the minimum level of concentration in respect of $OH^-$ that has to be at least attained in order to cause stabilisation of the gangue and to achieve easy separation of the liquid and solid phases.

For that purpose, an argillaceous uraniferous ore was subjected to pretreatment, the ore containing 25% by weight of water and, after drying, being of the following composition by weight:

| | |
|---|---|
| U | 0.064% |
| $SiO_2$ | 38.20% |
| $Al_2O_3$ | 4.30% |
| MgO | 7.40% |
| CaO | 12.60% |
| $Na_2O$ | 0.80% |
| $SO_4$ | 2.90% |
| $CO_2$ | 9.10% |
| various | 24.70% | the dry ore containing the following in percent by weight:

| | |
|---|---|
| quartz | 23.0 |

-continued

| clays | 54.0 |
|---|---|

The clays essentially comprised smectite, attapulgite and sepiolite.

100 g of the dry ore, being in crushed form and passing a sieve mesh size of 500 microns, was introduced into a cylindrical autoclave with a total capacity of 500 milliliters, with 300 g of an alkaline aqueous pretreatment solution, forming a suspension thereof.

The autoclave was placed in an electric furnace and subjected to oscillatory movements in a vertical plane about its transverse horizontal axis.

The suspension was very quickly raised to the required temperature of 180° C., in 3 minutes, and was held at that temperature for 30 minutes.

At the end of that period of time, a reaction vessel was immersed in cold water in order to cause rapid cooling of the suspension. After cooling to a temperature of 60° C., the suspension when pretreated in that way was subjected to a separation test which consisted of passing the suspension over a Büchner filter, with a vacuum of 500 millimeters of mercury, and thus measuring the speed of separation of the liquid phase in $\text{meter}^3 \times \text{hour}^{-1} \times \text{meter}^{-2}$.

In order to verify the efficiency of the pretreatment operation, that is to say, to be sure that the argillaceous gangue of the ore was in fact stabilised in a physical condition which is suitable for subsequent easy separation of the liquid and solid phases, the solid phase collected on the Büchner filter at the end of the pretreatment was subjected to a test concerning degradation in the presence of a carbonated aqueous solution.

The degradation test involved introducing the cake resulting from the pretreatment operation into a cylindrical-hemispherical reaction vessel of stainless steel, with an aqueous degradation solution containing 20 g/l of $Na_2CO_3$, with a ratio of 3 between the liquid and solid phases, expressed in grams.

The reaction vessel which was 2 liters in capacity was provided with a vertical-axis turbine having 3 vertical blades, rotating at a speed of 375 revolutions per minute.

The reaction medium was then raised to a temperature of 60° C., and then held at that temperature for 1 hour, all those operations being carried out with very vigorous agitation.

At the end of the degradation treatment, the suspension was again subjected to a separation test on a Büchner filter, again with a vacuum of 500 millimeters of mercury, measuring the speed of separation of the liquid phase in $\text{meter}^3 \times \text{hour}^{-1} \times \text{meter}^{-2}$.

Nine tests were carried out in accordance with the above-mentioned pretreatment and degradation procedure. The aqueous pretreatment solution was specific, for each of those tests.

Test 1 involved using permuted water as the aqueous pretreatment solution.

Test 2 was carried out, using an aqueous pretreatment solution containing 50 g/l of $Na_2SO_4$, giving a concentration of $2.10^{-6}$ g/l of $OH^-$.

Test 3 was carried out using as the pretreatment solution, a 50 g/l NaCl aqueous solution giving a concentration of $2.10^{-6}$ g/l of $OH^-$.

Test 4 was carried out using a pretreatment solution containing 50 g/l of $HNaCO_3$, giving a concentration of $2.10^{-5}$ g/l of $OH^-$.

Test 5 used an aqueous pretreatment solution containing 50 g/l of $Na_2CO_3$ giving an $OH^-$ concentration of $5.10^{-4}$ g/l.

Test 6 was carried out using a pretreatment solution containing 10 g/l of KOH, giving a concentration of $2.10^{-3}$ g/l of $OH^-$.

Test 7 was carried out using as the pretreatment solution, an aqueous ammonia solution containing 20 g/l of $NH_3$, giving an $OH^-$ concentration of $2.10^{-2}$ g/l.

Test 8 was carried out using a $Ca(OH)_2$-saturated aqueous pretreatment solution giving an $OH^-$ concentration of $5.4 \cdot 10^{-1}$ g/l.

Test 9 was carried out using an aqueous pretreatment solution containing 50 g/l of NaOH, giving an $OH^-$ concentration of 15 g/l.

The suspensions resulting from the pretreatment operation and the degradation test in each of the above-mentioned tests had a flocculating agent added thereto.

In tests 1 to 7, each suspension received, in an agitated condition, 20 cm³ of a 0.5 g/l solution of Floerger FA 10, prepared from a 2.5 g/l aqueous solution.

In tests 8 and 9, each suspension received, with agitation, 20 cm³ of a 0.5 g/l solution of Magnafloc 455, prepared from a 2.5 g/l aqueous solution.

The filtration rates are set out in Table I below.

TABLE I

| Test No | Concentration of $OH^-$ g/l of the pretreatment solution | Filtration rate in $m^3 \cdot h^{-1} \cdot m^{-2}$ | |
|---|---|---|---|
| | | after pretreatment | after degradation test |
| 1 | $2 \cdot 10^{-6}$ | 0.06 | 0.06 |
| 2 | $2 \cdot 10^{-6}$ | 0.21 | 0.13 |
| 3 | $2 \cdot 10^{-6}$ | 0.85 | 0.11 |
| 4 | $2 \cdot 10^{-5}$ | 1.1 | 0.35 |
| 5 | $5 \cdot 10^{-4}$ | 6.9 | 6.2 |
| 6 | $2 \cdot 10^{-3}$ | 6.7 | 6.1 |
| 7 | $2 \cdot 10^{-2}$ | 7.4 | 7.5 |
| 8 | $5.4 \cdot 10^{-1}$ | 10.1 | 9.9 |
| 9 | 15.0 | 8.9 | 8.9 |

That Table shows that on the one hand pretreatment of an argillaceous ore by means of an aqueous solution with a very low level of alkalinity does not stabilise the argillaceous gangue (tests 1 to 3) as the alkaline degradation test which is carried out after the pretreatment operation results in a fall in the liquid-solid phase separation capability, and on the other hand, the degree of alkalinity of the aqueous pretreatment solution must be at least $2.10^{-5}$ g/l in order to give an industrially acceptable level of filtrability (test 4) and favourable stabilisation of the argillaceous gangue (tests 5 to 9) by the pretreatment.

The Table also shows that the $OH^-$ concentration, as soon as it reaches a high level (test 9), does not cause any further substantial improvement in regard to separation of the phases and/or stabilisation of the gangue.

EXAMPLE 2

This Example concerns and illustrates the pretreatment operation in accordance with the process of the invention, for a highly kaolinitic argillaceous-gangue ore, followed by an attack operation using an attack process which forms part of the state of the art.

For that purpose, use is made of a urano-vanadiferous ore which, in the dry condition, was of the following composition expressed in percent by weight:

| U | 0.045 |
|---|---|

-continued

| | |
|---|---|
| V | 0.025 |
| $Al_2O_3$ | 34.10 |
| $Fe_2O_3$ | 0.95 |
| $YiO_2$ | 2.19 |
| $SiO_2$ | 48.40 |
| constituting water and various | 14.29 |

Analysis by X-ray diffraction showed that the argillaceous fraction of the gangue contained about 82% of kaolinite.

100 g of the dry ore, which passed a 500 micron sieve, was introduced into an autoclave with 300 milliliters of a 10 g/l NaOH solution giving an $OH^-$ concentration of 4.2 g/l.

The autoclave used (SOTELEM) was of stainless steel and had a capacity of 2 liters. It was provided with a vertical-axis turbine having three vertical blades, rotating at 150 rpm.

The aqueous medium was raised to 180° C. in 5 minutes and held at that temperature for a period of 30 minutes.

After that period of time, the suspension was cooled to 95° C. and then subjected to the injection of $CO_2$ until the whole of the NaOH still present was converted into $HNaCO_3$, and it was finally held at that temperature for 2 hours at 95° C.

The solution produced, to which 20 cm$^3$ of a 0.5 g/l solution of flocculating agent (Floerger FA 10) prepared from a 2.5 g/l aqueous solution was added with agitation, was subjected to a liquid-solid separation operation on a Büchner filter, with a vacuum of 500 mm of mercury.

The measured rate of filtration was 2.5 $m^2.h^{-1}.m^{-2}$ while the levels of solubilisation efficiency were 96% in respect of uranium and 76% in respect of vanadium.

By way of comparison, the same ore was subjected to the same attack process as that carried out above, but without the pretreatment according to the present invention.

For that purpose, 100 g of the dry ore, passing a 500 micron sieve, was introduced into the same autoclave with 300 milliliters of a bicarbonate solution containing 21 g/l of $NaHCO_3$. The aqueous medium was raised to 95° C. and held at that temperature for a period of 2 hours. The suspension produced, to which the same flocculating agent as previously, and in an identical amount, was added, was subjected to liquid-solid separation on a Büchner filter under a vacuum of 500 mm of mercury.

The measured rate of filtration was 0.13 $m^3.h^{-1}.m^{-2}$.

Thus, applying only a prior-art attack process to a highly argillaceous-gangue ore results in difficulty in separation of the liquid and solid phases, while using the process according to the invention, before attacking the ore, provides for easy separation of the phases after the ore has been subjected to attack.

EXAMPLE 3

This Example illustrates the relatively compensating effects of the parameters comprising the level of $OH^-$ concentration in the pretreatment solution and the period of time for which the pretreatment temperature is held at a constant value, when both of those parameters lie within the limits of the selected ranges.

For that purpose, the same ore as in Example 1 was treated in the same cylindrical autoclave with a total capacity of 500 milliliters, heated in an electric furnace, being subjected to oscillations in a vertical plane about its horizontal transverse axis.

Two tests were carried out in that autoclave, by introducing for each of those tests 100 g of the ore in dried form, passing a 500 micron sieve, and 300 milliliters of an aqueous solution containing sodium carbonate and bicarbonate in a ratio by weight of 0.86.

For the first test (test 10), the aqueous pretreatment solution contained 25.8 g/l of $NaHCO_3$ and 30 g/l of $Na_2CO_3$, giving an $OH^-$ concentration of 2.7. $10^{-4}$ g/l.

For the second test (test 11), the aqueous pretreatment solution contained 8.6 g/l of $NaHCO_3$ and 10 g/l of $Na_2CO_3$ giving an $OH^-$ concentration of 2.7. $10^{-5}$ g/l.

For each test, the suspension was very rapidly raised to the selected temperature of 180° C., in a period of 3 minutes, and held at that temperature for 5 minutes for test 10 and 30 minutes for test 11.

At the end of that period of time, the reaction vessel was immersed in cold water in order to cause rapid cooling of the suspension. After cooling to a temperature of 60° C., the suspension when pretreated in that way was subjected to the separation test which involved passing the suspension over a Büchner filter, under a vacuum of 500 mm of mercury, and thus measuring the speed of separation of the liquid phase in $m^3.h^{-1}.m^{-2}$. In order to check the efficiency of the pretreatment operation, that is to say, to be sure that the argillaceous gangue of the ore was properly stabilised in a physical condition which is advantageous in regard to subsequent easy separation of the liquid and solid phases, the solid phase collected on the Büchner filter at the end of the pretreatment operation was subjected to the degradation test in the presence of the above-mentioned carbonate solution.

The degradation test involved introducing the cake resulting from the pretreatment operation into the stainless steel cylindrical-hemispherical reaction vessel described in Example 1, with an aqueous solution containing 20 g/l of $Na_2CO_3$, with the ratio between the liquid and solid phases, expressed in grams, being equal to 3.

The reaction medium was then raised to a temperature of 60° C. and then held at that temperature for 1 hour, all those operations being carried out with violent agitation.

At the end of the degradation treatment, the suspension was again subjected to the separation test using the Büchner filter, again with a vacuum of 500 mm of mercury, measuring the rate of separation of the liquid phase in $m^3.h^{-1}.m^{-2}$.

The suspensions resulting from the pretreatment operation and the degradation test in the two tests referred to above had added thereto a flocculating agent in a proportion of 20 cm$^3$ of the 0.5 g/l solution of Floerger FA 10, prepared from a 2.5 g/l aqueous solution.

The results of the experiments are set out in Table II below:

TABLE II

| Test No | Concentration of $OH^-$ g/l of the pretreatment solution | Time in minutes for holding the temp at 180° C. | Filtration rate in $m^3 \cdot h^{-1} m^{-2}$ | |
|---|---|---|---|---|
| | | | after pretreatment | after degradation test |
| 10 | $2.7 \cdot 10^{-4}$ | 5 | 2.4 | 2.6 |
| 11 | $2.7 \cdot 10^{-5}$ | 30 | 1.8 | 1.9 |

Thus, the Table confirms that the degree of alkalinity of the pretreatment solution must be at least $2.10^{-5}$ g/l if the man skilled in the art wishes to stabilise the argillaceous gangue of the ore by the pretreatment operation. A slight increase in alkalinity above that lower limit value produces a substantial improvement in filterability, even for very short pretreatment times (test 10).

EXAMPLE 4

This Example sets out the relative and low influence of extending the time devoted to the degradation operation when the degradation test is carried out after performing the process according to the invention.

For that purpose, use was made of a urano-vanadiferous ore having an argillaceous gangue, which was of the following composition in percent by weight, in the dry condition:

| | |
|---|---|
| U | 0.117 |
| V | 0.034 |
| $Al_2O_3$ | 6.6 |
| CaO | 11.6 |
| $Fe_2O_3$ | 3.0 |
| $K_2O$ | 1.0 |
| MgO | 9.1 |
| $Na_2O$ | 1.3 |
| $SiO_2$ | 32.0 |
| $TiO_2$ | 0.7 |
| $CO_2$ | 9.95 |
| Cl | 1.78 |
| $SO_3$ | 1.02 |
| Binding $H_2O$ and various | 21.79 |

100 g of the dry, crushed ore, which passed a 500 micron sieve, was introduced into the 500 milliliter autoclave described in Example 1, with 300 milliliters of an alkaline aqueous solution recycled from a process for attacking said ore, which is intended to be used as an aqueous pretreatment solution. That solution was of the following composition:

| | |
|---|---|
| $Na_2CO_3$ | 30.0 g/l |
| $NaHCO_3$ | 23.4 g/l |
| $Na_2SO_4$ | 75.0 g/l |
| NaCL | 10.0 g/l | and gave an $OH^-$ concentration of $0.30 \cdot 10^{-3}$ g/l.

The autoclave was placed in an electric furnace and subjected to oscillatory movements in a vertical plane about its horizontal transverse axis.

The suspension was first raised to the selected temperature of 140° C. in 21 minutes, then to the temperature of 220° C. in 16 minutes and held at the latter temperature for 5 minutes.

After that period of time, the reactor was immersed in cold water in order to cause rapid cooling of the suspension. After cooling to a temperature of 60° C., a flocculating agent was added to the suspension by the addition of 20 cm³ of a 0.5 g/l solution of Floerger FA 10, prepared from a 2.5 g/l aqueous solution. After cooling to a temperature of 60° C., the suspension when pretreated in that way was subjected to the separation test which consisted of passing the suspension over a Büchner filter, under a vacuum of 500 mm of mercury, and thus measuring the rate of separation of the liquid phase in $m^3 \cdot h^{-1} \cdot m^{-2}$. That rate was 10.8 $m^3 \cdot h^{-1} \cdot m^{-2}$.

In order to check the efficiency of the pretreatment operation, that is to say, to verify that the gangue was in fact stabilised in a condition which is favourable to easy separation of the liquid and solid phases, the solid phase collected on the Büchner filter at the end of the pretreatment operation was subjected to the degradation test described in Example 1 in the presence of an aqueous carbonate solution.

The solid phase from the pretreatment operation was introduced into the stainless steel cylindrical-hemispherical reaction vessel with the aqueous degradation solution containing 20 g/l of $Na_2CO_3$ with the ratio between the liquid and solid phases, expressed by weight, being 3.

The reaction vessel was provided with a vertical-axis turbine having three vertical blades as referred to in Example 1.

The reaction medium was then raised to a temperature of 60° C. and then held at that temperature for a suitable time for each test, all those operations being carried out under specific agitation.

At the end of the degradation treatment, the suspension was again subjected to a separation test on a Büchner filter, again with a vacuum of 500 mm of mercury, with the rate of separation of the liquid phase being measured in $m^3 \cdot h^{-1} \cdot m^{-2}$.

Three tests were carried out: two tests (tests 12 and 13) using the above-mentioned procedure, each employing half the cake collected after the pretreatment, and one test (test 14) being a reference test, which had undergone only the degradation treatment, that is to say, which had not been subjected to the pretreatment process in accordance with the invention.

Test 12 involved introducing half the solid phase resulting from the pretreatment operation into the carbonate degradation solution, then raising the resulting suspension to a temperature of 60° C. and holding it at that temperature for 3 hours 30 minutes, while agitating the medium by means of the turbine which rotated at 150 rpm.

Test 13 involved introducing the other half of the solid phase resulting from pretreatment into the carbonate degradation solution and then raising the resulting suspension to the same temperature of 60° C. and holding it for 23 hours, while effecting agitation of the medium by means of the turbine rotating at 375 rpm.

Test 14, being the reference test, involved performing the same degradation test on 100 g of the above-mentioned dry ore, without it having been subjected to pretreatment, applying thereto the same procedure as in test 12.

For each test, the suspensions resulting from the pretreatment or the degradation test had added thereto a flocculating agent (Floerger FA 10) which was introduced in an amount sufficient to cause flocculation to permit separation of the liquid and solid phases. The flocculating agent was introduced in the form of an aqueous solution in a concentration of 0.5 g/l.

All the results are set out in Table III below.

TABLE III

| | Degradation test | | Amount of flocculating | Rate of |
|---|---|---|---|---|
| Test No | Time of holding at 60° C. | Speed of agitation rpm | agent in grams per tonne of ore | filtration in $m^3 \cdot h^{-1} \cdot m^{-2}$ after degradation |
| 12 | 3 hours 30 mins | 150 | 164 | 8.9 |
| 13 | 23 hours | 375 | 271 | 5.6 |
| 14 | 3 hours | 150 | 290 | 0.07 |

TABLE III-continued

| Test No | Degradation test Time of holding at 60° C. | Speed of agitation rpm | Amount of flocculating agent in grams per tonne of ore | Rate of filtration in m³·h⁻¹·m⁻² after degradation |
|---|---|---|---|---|
| | 30 mins | | | |

The Table shows that, once the pretreatment according to the invention has been carried out, the argillaceous gangue of the ore is stabilised, even in regard to a long and very vigorous degradation test. It also shows that an argillaceous ore which is not subjected to the pretreatment does not stand up to a degradation test, even when short and moderate.

EXAMPLE 5

This Example sets out to show the minimum pretreatment temperature threshold which subsequently results in easy separation of the liquid and solid phases.

For that purpose, use is made of the ore whose composition was set forth in Example 1.

100 g of the dry, crushed ore, which passes a 500 micron sieve, was introduced into the 500 milliliter autoclave described in Example 1, with 300 milliliters of an alkaline aqueous solution recycled from an ore attack process, which is to be used as the aqueous pretreatment solution. The composition of that solution was as follows:

| | |
|---|---|
| NaCO$_3$ | 30.0 g/l |
| NaHCO$_3$ | 23.4 g/l |
| Na$_2$SO$_4$ | 75.0 g/l |
| NaCl | 10.0 g/l | and gave an OH⁻ concentration of 0.30. 10⁻³ g/l.

The autoclave was placed in an electric furnace and subjected to oscillatory movements, as described in the previous Examples.

The suspension was rapidly raised to a selected temperature, in a period of 3 minutes, then held at that temperature for 30 minutes.

The autoclave was then cooled to 60° C. by being immersed in cold water.

The suspension was finally subjected to the filtration test on a Büchner filter under a vacuum of 500 mm of mercury, in order to measure the rate of separation of the liquid phase in m³.h⁻¹.m⁻².

The results of the tests at various holding temperatures are set out in Table IV below:

TABLE IV

| Test No | Holding temperature (30 min) in °C. | Rate of separation of the liquid phase in m³·h⁻¹·m⁻² |
|---|---|---|
| 15 | 80 | 0.17 |
| 16 | 100 | 0.17 |
| 17 | 120 | 1.5 |
| 18 | 140 | 6.7 |
| 19 | 160 | 9.1 |
| 20 | 180 | 10.1 |
| 21 | 220 | 14.8 |
| 22 | 280 | 15.0 |

Thus, the Table confirms the excellent results produced by carrying out the process according to the invention when the pretreatment operation is performed at a temperature of at least 120° C.

EXAMPLE 6

This Example shows the influence of the time required to raise the suspension of the ore to the minimum pretreatment temperature according to the invention.

For that purpose, use was made of the ore whose composition is set forth in Example 1.

100 g of that ore, in a dried and crushed condition, which passes through a 500 micron sieve, was introduced into the 500 milliliter autoclave referred to in Example 1, with 300 milliliters of an alkaline aqueous solution recycled from a process of attacking said ore, which is intended to be used as the aqueous pretreatment solution. The solution was of the following composition:

| | |
|---|---|
| NaCO$_3$ | 30.0 g/l |
| NaHCO$_3$ | 23.4 g/l |
| Na$_2$SO$_4$ | 75.0 g/l |
| NaCl | 10.0 g/l | and gave an OH⁻ concentration of 0.30.10⁻³ g/l.

The autoclave was placed in an electric furnace and subjected to oscillatory movements, as described in the preceding Examples.

Five tests involving increasing the temperature to 220° C. were carried out, each test being performed with a specific temperature increase rate characterised by the time expressed in minutes to go to 120° C. ($T_{120° C.}$).

At the end of the phase involving increasing the temperature to 220° C., the autoclave was then cooled to 60° C. by immersing it in cold water.

The suspension was finally subjected to the filtration test on a Büchner filter under a vacuum of 500 mm of mercury in order to measure the rate of separation of the liquid phase in m³.h⁻¹.m⁻².

The results of those tests at various rates of temperature increase to 220° C. are set forth in Table V below.

TABLE V

| Test No | Time to go 120° C. ($T_{120° C.}$) in mins | Rate of separation of the liquid phase in m³·h⁻¹·m⁻² |
|---|---|---|
| 23 | 3 | 17.0 |
| 24 | 6 | 13.4 |
| 25 | 14 | 8.7 |
| 26 | 22 | 7.0 |
| 27 | 47 | 0.7 |

The Table shows in absolute terms the need very rapidly to attain the pretreatment temperature in order to provide a high level of suitability for subsequent separation of the liquid and solid phases.

EXAMPLE 7

This Example shows the favourable effect of drying the ore being carrying out the pretreatment operation.

For that purpose, test 26 of Example 6 was repeated, being carried out on the same ore as in Example 1 but before it had been dried.

It then contained 25% of water in percent by weight.

The results of this new test, together with the results of test 26, are set out in Table VI below:

TABLE VI

| Test No | % water by weight of ore intended for pretreatment | Time to go to 120° C. in mins | Rate of separation of the liquid phase in m$^3 \cdot$h$^{-1} \cdot$m$^{-2}$ |
|---|---|---|---|
| 26 | 1.5 (dried) | 22 | 7.0 |
| 27 | 25 (not dried) | 20 | 4.3 |

Thus, it can be seen from this Table that, if it is not essential to dry the ore before subjecting it to pretreatment, it is however an attractive proposition to do so, in order to improve the capacity for separation of the solid and liquid phases.

EXAMPLE 8

This Examples illustrates the favourable effect on the capacity for separation of the liquid and solid phases, of the ratio of the liquid phase to the solid phase (L/S) in cubic meter per tonne.

Six tests were carried out on the ore of Example 1.

For each of those tests, 40 g of the ore in dried, crushed form, which passed a 500 micron sieve, was introduced into the 500 milliliter autoclave described in Example 1, with an alkaline aqueous solution recycled from an ore attack process, which is intended to be used as the aqueous pretreatment solution. The composition of that solution was as follows:

| | |
|---|---|
| Na$_2$CO$_3$ | 30.0 g/l |
| NaHCO$_3$ | 23.4 g/l |
| Na$_2$SO$_4$ | 75.0 g/l |
| NaCl | 10.0 g/l | and gave an OH$^-$ concentration of 0.30.10$^{-3}$ g/l.

The L/S ratio as defined above is specific to each test.

For each of the tests, the pretreatment operation was carried out in the same reaction vessel as that described in Example 1. The pretreatment temperature of 180° C. was reached in three minutes and it was held at that temperature for 30 minutes.

All the other conditions in regard to cooling, flocculation and the separation test are the same as described in Example 1.

Table VII below sets out at the same time the L/S values produced and the results obtained.

TABLE VII

| Test No | L/S ratio in m$^3 \cdot$T$^-$of ore | Rate of separation of the liquid phase in m$^3 \cdot$h$^{-1} \cdot$m$^{-2}$ |
|---|---|---|
| 29 | 1.5 | stable, non-filtrable plastic suspension |
| 30 | 2.0 | 1.2 |
| 31 | 2.5 | 4.3 |
| 32 | 3.0 | 13.2 |
| 33 | 6.0 | 15.0 |
| 34 | 10.0 | 15.2 |

Thus, the results set out in that Table show the attraction of carrying out the pretreatment operation in accordance with the invention at an L/S ratio which is preferably at least 2.

EXAMPLE 9

This Example concerns and illustrates the pretreatment in accordance with the process of the invention, in respect of a urano-molybdeniferous ore having a relatively slightly argillaceous gangue.

For that purpose, use was made of an ore which, in the dry condition, was of the following composition expressed in percent by weight:

| | |
|---|---|
| U | 0.20 |
| Mo | 0.15 |
| AS | 0.04 |
| S | 0.20 |
| Al | 7.0 |
| Ba | 0.035 |
| Ca | 0.1 |
| Fe | 1.1 |
| K | 2.2 |
| Mg | 0.1 |
| Na | 1.0 |
| Si | 35.0 |
| Ti | 0.25 |
| Oxygen of the oxides, binding water and various | 52.625 |

Taking those ores, a percentage of clay of close to 10% by weight was found.

Two tests were carried out on the basis of that ore, using the general conditions set out below as regards the pretreatment part of the procedure.

100 g of the ore in dry, crushed condition, which passes a 500 micron sieve, was introduced into the 500 milliliter autoclave described in Example 1, with 200 milliliters of an alkaline aqueous solution recycled from a process of attack on said ore, which is intended to be used as the aqueous pretreatment solution. The composition of the solution was as follows:

| | |
|---|---|
| Na$_2$CO$_3$ | 50.0 g/l |
| NaHCO$_3$ | 80.0 g/l |
| Na$_2$SO$_4$ | 38.3 g/l |
| Mo | 11.9 g/l | and the solution gave an OH$^-$ concentration of 2.10$^{-4}$ g/l.

The autoclave was placed in an electric furnace and subjected to agitation by oscillation.

The suspension was raised to the selected temperature of 180° C. in 5 minutes and then held at that temperature for 30 minutes.

For the first test (test 35), the suspension resulting from pretreatment was rapidly cooled to a temperature of 60° C. and then, after having been processed by flocculation in accordance with the conditions described in Example 1, it was subjected to the separation test involving filtration on a Büchner filter under a vacuum of 500 mm of mercury. The rate of separation of the liquid phase was 3.7 m$^3$.h$^{-1}$.m$^{-2}$.

For the second test (test 36), the suspension after the pretreatment was raised to a temperature of 205° C., in the same reaction vessel, and then held at that temperature for 60 minutes in the presence of oxygen which was blown in under a partial pressure of 5 bars. The second phase of treatment was for the purpose of solubilising the uranium and the molybdenum which can be put to use.

The resulting suspension was cooled to 60° C., and the flocculated and filtered under the same conditions as in test 35. The rate of separation of the liquid phase was 3.3 m$^3$.h$^{-1}$.m$^{-2}$ while the levels of efficiency of solubilisation of the uranium and molybdenum were 97% and 95%.

Finally, a last test (test 370) was carried out, using the same ore and the same solutions, but without applying the pretreatment in accordance with the invention. The suspension of the ore was raised to 205° C. in a period of 120 minutes and then held at that temperature for 60 minutes.

The suspension when treated in that way was cooled, flocculated and filtered as in test 35.

The rate of separation of the liquid phase was 0.29 $m^3.h^{-1}.m^{-2}$ while the levels of efficiency in regard to solubilisation of the uranium and molybdenum were 97.3% and 95.4%.

Thus, it appears that this ore, although its gangue is slightly argillaceous, enjoys an improved capacity for separation, by virtue of the phenomenon demonstrated in regard to ores having a gangue which is much more argillaceous.

EXAMPLE 10

This Example concerns and illustrates the pretreatment in accordance with the process of the invention, on a gold-bearing ore having an argillaceous gangue.

For that purpose, use was made of an ore which, in the dry condition, was of the following composition expressed in percent by weight:

| Au | 6 ppm (parts per million) |
|---|---|
| $SiO_2$ | 57.5 |
| $TiO_2$ | 1.6 |
| $Al_2O_3$ | 22.5 |
| $Fe_2O_3$ | 2.9 |
| MgO | 0.7 |
| CaO | 0.55 |
| $Na_2O$ | 1.0 |
| $K_2O$ | 1.5 |
| binding water and various | 11.75 |

Taking that ore, a percentage of clay of close to 54% by weight, essentially comprising kaolinite and chlorite, was found.

100 g of the ore in a dry, crushed condition, which passes a 500 micron sieve, was introduced into a cylindrical autoclave with a total capacity of 500 milliliters, with 300 g of a close pretreatment alkaline aqueous solution, forming a suspension.

The autoclave was placed in an electric furnace and subjected to oscillatory movements in a vertical plane about its horizontal transverse axis.

The suspension was very quickly raised to the selected temperature of 180° C., in 3 minutes, and was held at that temperature for 30 minutes.

After that period, the autoclave was immersed in cold water in order to cause rapid cooling of the suspension. After being cooled to a temperature of 60° C., the suspension when pretreated in that way was subjected to a separation test which involved passing the suspension over a Büchner filter, under a vacuum of 500 mm of mercury, and thus measuring the rate of separation of the liquid phase in $m^3.h^{-1}.m^{-2}$.

In order to check the efficiency of the pretreatment operation, that is to say, in order to be sure that the argillaceous gangue of the ore was actually stabilised in a physical condition suited to subsequent easy separation of the liquid and solid phases, the solid phase collected on the Büchner filter at the end of the pretreatment operation was subjected to a degradation test in the presence of an alkaline aqueous solution.

The degradation test involved introducing the cake from the pretreatment operation into a stainless steel cylindrical-hemispherical reaction vessel with an aqueous degradation solution identical to that of the pretreatment solution with a ratio between the liquid and solid phases of 3, expressed in m3/t. The reaction vessel which was 2 liters in capacity was provided with a vertical-axis turbine having three vertical blades rotating at 375 rpm.

The reaction medium was then raised to a temperature of 60° C. and then held at that temperature for 1 hour, with all those operations being carried out with very vigorous agitation.

At the end of the degradation treatment, the suspension was again subjected to a separation test on a Büchner filter, again with a vacuum of 500 millimeters of mercury, measuring the speed of separation of the liquid phase in $m^3.h^{-1}.m^{-2}$.

Two tests were carried out: one test (test 37) being in accordance with the pretreatment and degradation procedure referred to above while the other (test 38) was performed in accordance just with the degradation procedure.

Test 37 was carried out using an aqueous pretreatment solution containing 0.2 g/l of NaCl and 2 g/l of $Ca(OH)_2$, giving an $OH^-$ concentration of $10^{-2}$ g/l.

Test 38 was carried out using the same aqueous solution as test 37.

The suspensions resulting from the pretreatment operation and/or the degradation test in each of the tests referred to above had a flocculating agent added thereto.

In tests 37 and 38, added with agitation to each suspension was 20 $cm^3$ of a 0.5 g/l solution of Floerger FA 10, prepared from a 2.5 g/l aqueous solution.

The rates of filtration are set out in Table VIII below.

TABLE VIII

| Test No | Concentration of $OH^-$ g/l of the pretreatment and/or degradation solution | Rate of filtration in $m^3 \cdot h^{-1} \cdot m^{-2}$ After pretreatment | After degradation test |
|---|---|---|---|
| 37 | $10^{-2}$ | 3.8 | 3.2 |
| 38 | $10^{-2}$ | — | 0.07 |

This Table shows that, in the absence of the pretreatment operation according to the invention, the capability for separation of the liquid and solid phases is very low. In contrast, the capability for separation of the phases becomes excellent when the pretreatment operation is carried out.

EXAMPLE 11

This Example illustrates pretreatment in accordance with the process of the invention, in respect of an ore formed by a nickel-bearing laterite with an argillaceous gangue.

For that purpose, use was made of an ore which, in the dry condition, was of the following composition expressed in percent by weight:

| Ni | 1.5 |
|---|---|
| Co | 0.3 |
| $SiO_2$ | 53.9 |
| $Al_2O_3$ | 11.8 |
| $Fe_2O_3$ | 26.0 |
| Binding water and various | 6.5 |

Taking that ore, the percentage of clay found was close to 30% by weight (kaolinite).

Six tests were carried out:

The first two tests (tests 39 and 40) were carried out on the basis of that ore, using the general conditions set forth in Example 10, but with a pretreatment and degradation solution comprising an aqueous solution of ammonia.

Two other tests (41 and 42) were also carried out using the same ore, under the general conditions set out in Example 10.

Test 39 used as the pretreatment and degradation solution, an aqueous solution containing 50 g/l of ammonia, representing an $OH^-$ concentration of $4.10^{-2}$ g/l.

Test 40 was carried out using an aqueous degradation solution without pretreatment, with an ammonia composition identical to that of test 39.

Test 41 first used a $Ca(OH)_2$-saturated alkaline aqueous pretreatment solution giving an $OH^-$ concentration of $5.4.10^{-1}$ g/l, then an acid degradation solution at 60° C. which is maintained at a pH-value of between 2 and 3 by the addition of $H_2SO_4$.

Test 42 used an acid degradation solution identical to that used in test 41 without carrying out the pretreatment in accordance with the invention.

Test 43 was carried out firstly using a $Ca(OH)_2$-saturated alkaline aqueous pretreatment solution of the same concentration as in test 41, followed by a degradation test carried out in the same autoclave as that described in Example 10, operating at a temperature of 240° C. in an initially acid medium (60 kg $H_2SO_4$/tonne of ore) with an L/S ratio of 3 (in $m^3/t$).

Test 44 was carried out using an acid degradation solution identical to that used in test 43.

The results of the experiments are set out in Table IX below.

grams per liter of $OH^-$ ions, the ratio of volume of said solution in cubic meters to weight of ore in tonnes, being at least about 2;

(c) immediately increasing the temperature of said pretreatment solution in contact with said ore to a pretreatment temperature of at least 120° C. in a pressurized vessel, the period of time of the increase being at most 30 minutes reckoned from the time at which said ore is contacted with said aqueous pretreatment solution;

whereby the argillaceous gangue is stabilized, and whereby liquid and solid components can be easily separated after said attack operation of said ore.

2. A high-temperature pretreatment process according to claim 1, additionally comprising subjecting the ore to a drying operation prior to said step of adjusting.

3. A high-temperature pretreatment process acording to claim 1, additionally comprising subjecting the ore to a drying operation simultaneously with said step of adjusting.

4. A high-temperature pretreatment process according to claim 1, wherein said step of adjusting is effected by crushing without adding water.

5. A high-temperature pretreatment process according to claim 1, wherein the concentration in respect of $OH^-$ ions of the aqueous pretreatment solution is between $2\times10^{-5}$ g/l and 20 g/l.

6. A high-temperature pretreatment process according to claim 1, wherein said pretreatment temperature is in the range of from 140° C. to 300° C.

7. A high-temperature pretreatment process according to claim 1, wherein said period of time of the in-

TABLE IX

| | Pretreatment | | | | | Degradation | | | | |
|---|---|---|---|---|---|---|---|---|---|---|
| Test No | Nature of solution | L/S | $(OH^-)$ in g/l | Duration in mins | Temperature in °C. | Rate of filtration in $m^3 \cdot h^{-1} \cdot m^{-2}$ | Nature of solution | L/S | Duration in mins | Temp in °C. | Rate of filter. $m^3 \cdot h^{-1} \cdot m^{-2}$ |
| 39 | $NH_3$ | 3 | $4 \cdot 10^{-2}$ | 30 | 180 | 3.1 | $NH_3$ | 3 | 60 | 60 | 2.9 |
| 40 | — | — | — | — | — | — | $NH_3$ | 3 | 60 | 60 | 0.1 |
| 41 | $Ca(OH)_2$ | 3 | $5.4 \cdot 10^{-1}$ | 30 | 180 | 5.3 | $H_2SO_4$ pH 2-3 | 3 | 60 | 60 | 4.8 |
| 42 | — | — | — | — | — | — | $H_2SO_4$ pH 2-3 | 3 | 60 | 60 | 0.2 |
| 43 | $Ca(OH)_2$ | 3 | $5.4 \cdot 10^{-1}$ | 30 | 180 | 5.1 | $H_2SO_4$ 60 kg/t | 3 | 180 | 240 | 3.5 |
| 44 | — | — | — | — | — | — | $H_2SO_4$ 60 kg/t | 3 | 180 | 240 | 0.15 |

The results set out in the foregoing Table show the attraction of carrying out pretreatment on nickel-cobalt ores with an argillaceous gangue, whether the subsequent treatment operations, for example an operation of attacking said ore, are carried out in an acid or alkaline medium, at low or high temperature.

We claim:

1. A process for high temperature pretreatment by means of an aqueous pretreatment solution, of crushed ores containing at least one metal element, whose gangue contains argillaceous compounds which, in an attack operation of the ore, are capable of forming a stable plastic suspension in the presence of water, which suspension cannot be subject to effective separation into liquid and solid components by filtration or settlement, comprising the steps of:

(a) adjusting the granulometry of the ore to at most equal to the liberation sieve mesh size of said at least one metal element;

(b) contacting said adjusted ore with an aqueous pretreatment solution containing at least $2\times10^{-5}$ crease in temperature to the pretreatment temperature is between instantaneous and 20 minutes.

8. A high-temperature pretreatment process according to claim 1, additionally comprising the step of holding the pretreatment solution in contact with said ore, after reaching said pretreatment temperature, at a temperature which is at least said pretreatment temperature for a period of time of between 1 and 60 minutes.

9. A high-temperature pretreatment process according to claim 1, wherein for the duration of the treatment, the aqueous pretreatment solution in contact with the ore is subjected to an agitation effect which is at least sufficient to resist settlement of the largest grains of solid in contact with the pretreatment solution.

10. A high-temperature pretreatment process according to claim 1, additionally comprising introducing an oxidation agent into the pretreatment solution.

11. A high-temperature pretreatment process according to claim 10 characterised in that the oxidation agent is selected from the group consisting of air, oxygen-enriched air, oxygen alone, ozone, hydrogen peroxide, potassium permanganate and persulphates.

12. A high-temperature pretreatment process according to claim 10 or claim 11, wherein said oxidation agent is gaseous, and wherein there is an oxygen partial pressure in said pressurized vessel of between 0.1 and 20 bars.

13. A high-temperature pretreatment process according to claim 12, wherein said oxygen partial pressure is between 5 and 15 bars.

14. A high-temperature pretreatment process according to claim 1, wherein $CO_2$ gas is blown into the reaction medium while the pretreatment solution is in contact with the ore.

15. A high-temperature pretreatment process according to claim 5, wherein the concentration in respect of $OH^-$ ions of the aqueous pretreatment solution is between $2.10^{-4}$ g/l and 12 g/l.

16. A high-temperature pretreatment process according to claim 1, wherein the ratio of the liquid phase expressed in cubic meters to the solid phase expressed in tons of ore is between 2 and 10.

* * * * *